United States Patent
Hrinya et al.

(10) Patent No.: US 6,204,989 B1
(45) Date of Patent: Mar. 20, 2001

(54) CONTROLLING A MEDIA MASTER WRITING MACHINE TO PRODUCE CURVILINEAR SERVO SECTOR PATTERNS

(75) Inventors: Stephen J. Hrinya; Karl A. Belser, both of San Jose, CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/075,781

(22) Filed: May 11, 1998

(51) Int. Cl.[7] .................................................. G11B 5/596
(52) U.S. Cl. ..................... 360/77.06; 360/97.08; 360/75
(58) Field of Search ............................... 360/77.05, 77.06, 360/77.08, 75, 48, 51, 53; 369/44.26, 32, 58

(56) References Cited

U.S. PATENT DOCUMENTS

| | | | |
|---|---|---|---|
| 4,209,810 | * 6/1980 | Ragle et al. | 360/77.06 |
| 5,067,039 | 11/1991 | Godwin et al. | 360/135 |
| 5,108,781 | 4/1992 | Ranjan et al. | 427/53.1 |
| 5,283,773 | 2/1994 | Thomas et al. | 369/44.26 |
| 5,322,987 | 6/1994 | Thomas et al. | 219/121.68 |
| 5,334,849 | 8/1994 | Thomas et al. | 250/559 |
| 5,485,322 | 1/1996 | Chainer et al. | 360/51 |

FOREIGN PATENT DOCUMENTS

| | | |
|---|---|---|
| 0660324 | 6/1995 | (EP). |
| 2-044576 | 2/1990 | (JP). |
| 2-156440 | 6/1990 | (JP). |
| 9-138925 | 5/1997 | (JP). |

* cited by examiner

*Primary Examiner*—Muhammad Edun
(74) *Attorney, Agent, or Firm*—Simon & Koerner LLP

(57) ABSTRACT

Curvilinear servo sector patterns are produced on a master media by determining a series of offsets between a radially aligned reference and the desired curvilinear servo sector and expressing each offset as a delay that can be expressed in settings for controlling a master writer. Incorporation of the delay into the master writer allows a curvilinear servo sector pattern to be produced using data mapping that is ordinarily used for the radially aligned servo sector pattern. Thus, curvilinear servo sector patterns with a desired resolution are produced without increasing computational overhead or memory requirements, or decreasing throughput. The delay can be converted into control settings such as sector delay, clock cycle delay and residual fractional delay settings that each represent a portion of the delay. In certain embodiments, a piece-wise linear approximation of the curvilinear shape can be implemented to reduce the amount of required control data, and a master writer controller that generates pulses for multiple lasers can be implemented.

20 Claims, 12 Drawing Sheets

CONTROLLING A MEDIA MASTER WRITING MACHINE TO PRODUCE CURVILINEAR SERVO SECTOR PATTERNS

BACKGROUND OF THE INVENTION

1. Field of the Invention

This invention relates generally to producing a media master, and more particularly to writing curvilinear servo sector patterns on a media master.

2. Background Art

Many data storage disk systems incorporate an actuator arm that carries a read/write head above the surface of a disk. The actuator arm is coupled to an actuator assembly that causes the arm to rotate about a pivot point. This causes the head to travel along an arc segment corresponding to a circle centered about the pivot point with a radius determined by the length of the actuator arm.

During operation, the rotation of the disk and the movement of the head provide a location of the head relative to the disk surface. A typical disk includes many servo sectors which collectively form a servo sector pattern. The servo sector pattern provides encoded information that is read during disk operations to determine the location of the head relative to the disk surface.

One type of servo sector pattern is radially aligned. The servo sectors are aligned with a disk radius and extend between the inner diameter and the outer diameter of the disk. The servo sectors divide the usable data zone into a corresponding plurality of data wedges, and the disk surface includes a plurality of concentric data tracks which are typically spaced at a constant pitch $T_p$.

A problem with the radially aligned servo sectors is that they are not aligned with the arc segment along which the head typically travels. It is more desirable to have servo sectors that are aligned with the arc segment, so that a head traveling over a disk rotating at constant speed will encounter servo sectors at a constant rate, independent from the radial position of the head. Although they are shaped differently, the spacing, number and encoded information in the arc segment shaped servo sectors can be the same as their radially aligned counterparts.

One mechanism for producing disks is from a master disk having the desired servo sector pattern. A conventional master writing tool can comprise an air bearing spindle onto which a glass master substrate is mounted. To write the master, the glass substrate is uniformly coated with photoresist which is exposed by an optical spot. A linear actuator whose position is sensed by a laser inteferometer can be used to radially position the spot. In conventional fashion, the exposed spots are used to produce pits on the master disk. The master disk provides a mold that, using conventional techniques, is used to make data storage disks.

A conventional master writing system can generate an index pulse corresponding to each disk revolution and include a precision angle encoder for determining the circumferential positioning of the master disk. This information and a bit map of the servo sector data can be used to write a master having a radially aligned servo sector pattern. Conventional master writing systems are inadequate for producing arc segment shaped servo sector patterns for various reasons. For one, the conventional system uses a coordinate system that assumes a radially aligned servo sector. Additionally, increased resolution is needed to ensure that adjacent pit locations are evenly aligned along the arc segment shape. This requires much more memory and presents a throughput problem.

Thus, there remains a need for a master writing system that can produce curvilinear (e.g. arc segment) shaped servo sector patterns.

SUMMARY OF THE INVENTION

The present invention provides apparatuses and methods for producing curvilinear servo sector patterns, as well for generating master writer control settings that are used to produce curvilinear servo sector patterns.

In certain embodiments, offsets between a radially aligned reference and the desired curvilinear servo sector are determined, and these offsets are used to produce the curvilinear servo sector pattern using information (such as a bit map) that is ordinarily used to produce a radially aligned servo sector pattern.

The offset between the radially aligned reference and the curvilinear servo sector pattern is a function of the radial position on the surface of the disk. This radial position can be determined according to the track number. Thus, a plurality of offsets can be determined, with each offset associated with one or more tracks. Each offset can be converted into a delay which is the amount of time that it takes for the disk to rotate through the offset, or from the radially aligned reference axis to the curvilinear servo sector.

The delay can be converted into master writer control settings that are used to produce the curvilinear servo sector pattern. For example, the delay can be converted into sector delay, clock cycle delay and residual delay values. The sector, clock cycle and residual delay values each represent a portion of the delay. The sector delay is an integer number of sectors that the offset spans (i.e. the number of intervening servo sectors). This number of sectors may not account for the full delay. The remaining delay is provided by the clock cycle delay, which is an integer number of clock cycles, and a residual delay, which is a fractional clock cycle.

The sector, clock cycle and residual delay values can be converted into bytes of data used to control a master writer. The master writer can implement the same mapping information for the encoded information in a radially aligned servo sector pattern to produce the curvilinear servo sector pattern because the control settings cause the master writer to delay the generation of laser pulses by an amount that corresponds to the offset between the radially aligned case and the curvilinear case.

In other embodiments, a piece-wise linear approximation of the curvilinear shape can be implemented to reduce the amount of required control data. In one embodiment, this is done by determining an interpolation constant for each linear piece, and adjusting the delay values accordingly. In lieu of a series of values, the residual delay portion can thus have a base value and a linear increment.

In still further embodiments, a master writer controller that generates pulses for multiple lasers can also be implemented. The first and second laser pulse streams can have different pulse parameters and different offsets. To accommodate these differences, the master writer control circuitry that defines the pulse parameters and provides the residual delay (fractional clock cycles) can be replicated.

DETAILED DESCRIPTION OF THE INVENTION

Figure 1:
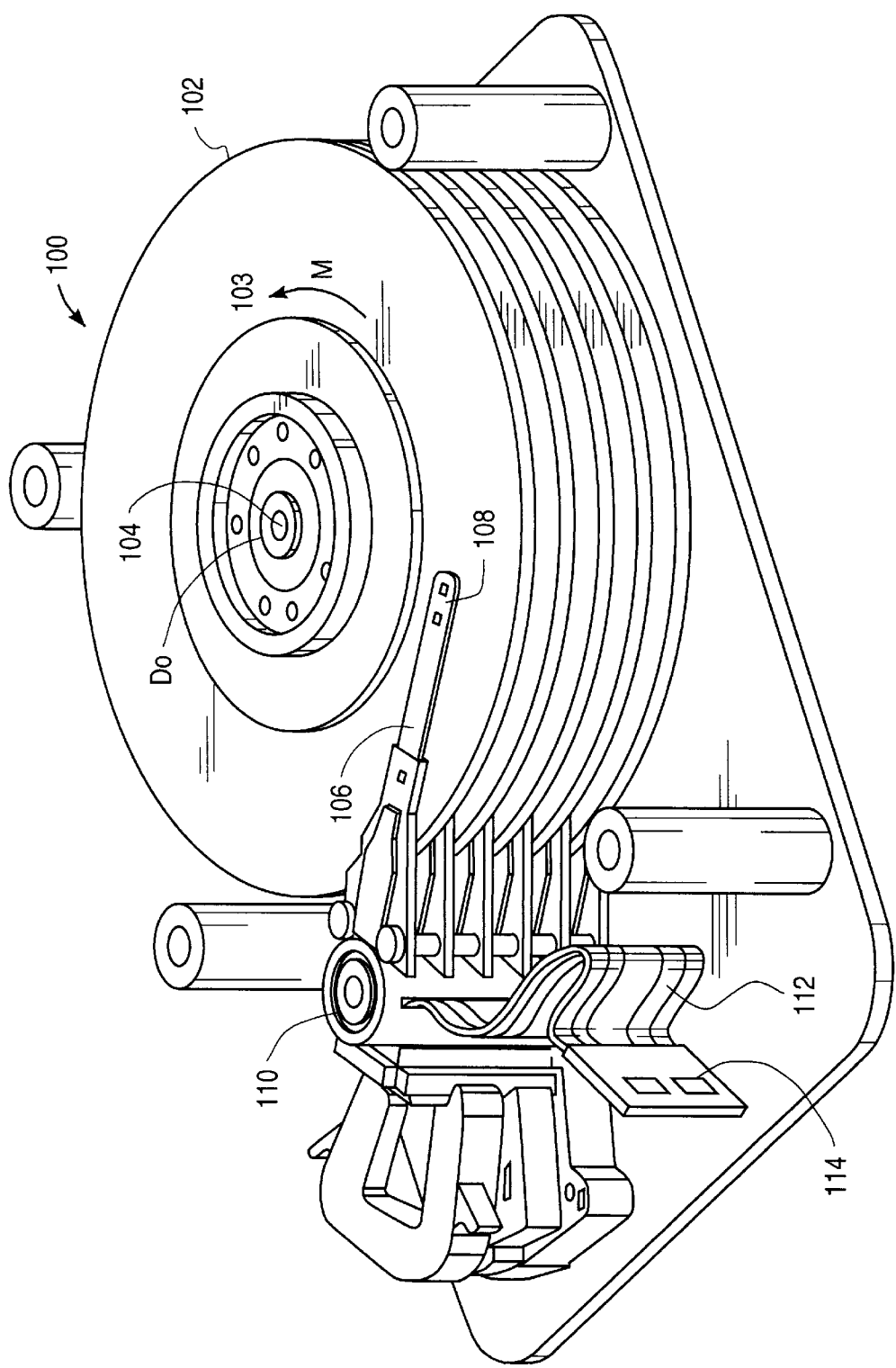
FIG. 1 is a schematic illustrating an embodiment of a data storage system.

Referring now to the block diagram of FIG. 1, an exemplary data storage disk system 100 comprises a plurality of disks 102 mounted on a drive spindle 104 which extends through the disk center holes $D_o$. The disks 102 rotate counter clockwise (as shown by the arrow M) at a speed which can be measured in revolutions per minute. An actuator arm 106 carries at one end a flying read/write head 108 above the surface 103 of a selected disk 102. Although the head 108 is shown over the upper surface of the topmost disk in the stack, it is understood that the head 108 can reside over the upper and lower surfaces of any of the plurality of disks 102. The opposing end of the actuator arm 106 is coupled to a rotary actuator assembly 110 arranged to rotate the actuator arm 106, and thus the head 108, about a pivot axis. Data pulse signals are received from the relevant disk surface 103, and can be transferred in conventional fashion along arm 106 through cable assembly 112 to a disk drive control system with signal processing electronics 114, which can alternatively reside on or be remote from the head 108.

The rotation M of the disk 102 and the movement of the head 108 about the actuator assembly 110 pivot axis provide a location for the head 108 over the surface 103 of the disk 102. A typical disk surface 103 includes many servo sectors which collectively form a servo sector pattern. The servo sectors encode positional information, such as the circumferential and radial positional locations on the disk 108. The positional information can be read during operation to indicate the location of the head 108 over the disk 102.

Figure 2:
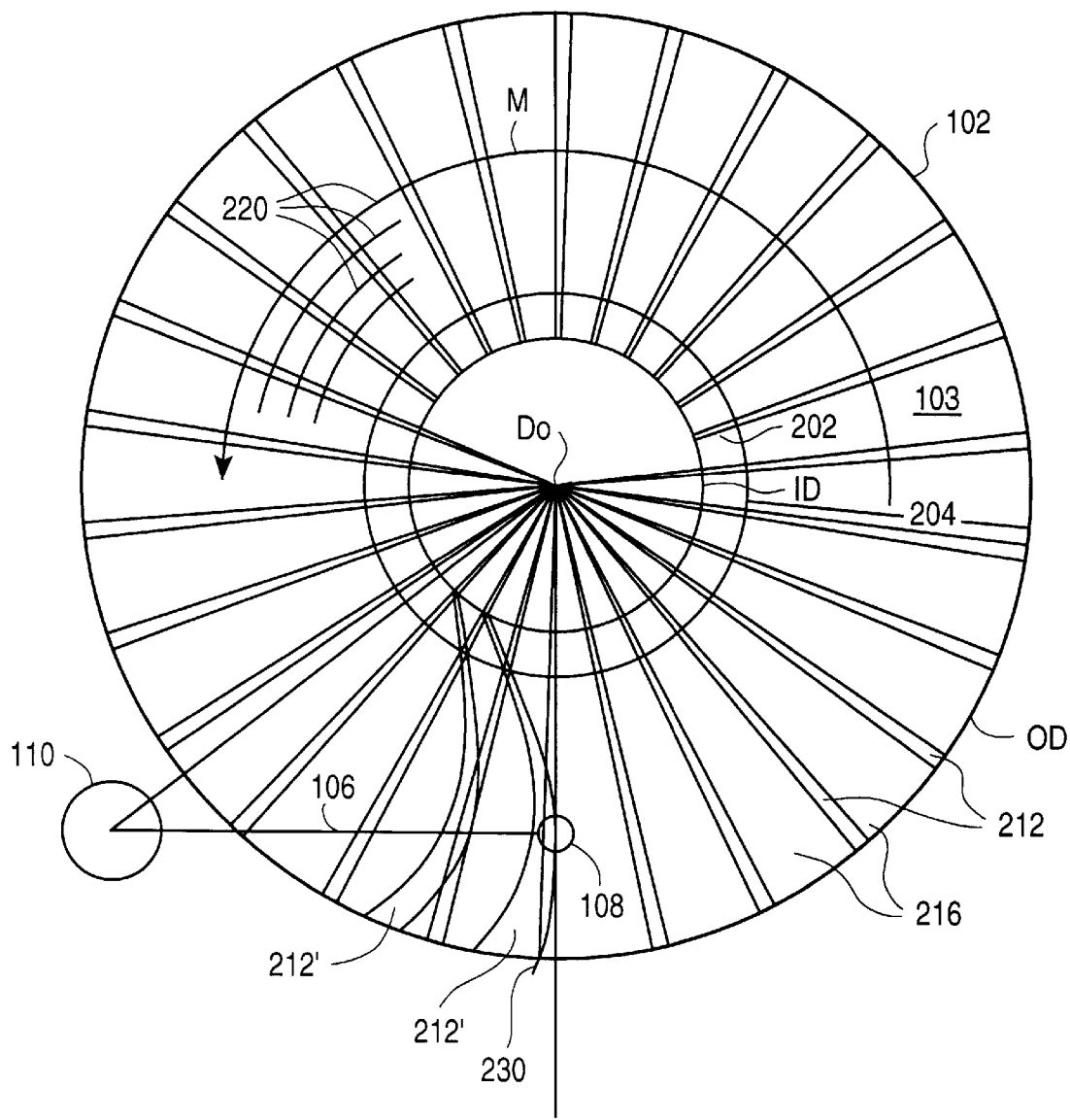
FIG. 2 is a schematic illustrating radially aligned and curvilinear servo sector patterns.

The schematic diagram of FIG. 2 illustrates exemplary radially aligned servo sectors 212 on the surface 103 of a disk 102. The disk 102 includes a start up zone 202 located at the inner portion of the disk, and a usable data zone 204 extending from the outer boundary of the start up zone 202 to the outer diameter OD of the disk 102. The servo sectors 212 are wedge shaped regions that extend between the inner diameter (ID) and the outer diameter (OD) of the disk 202. Approximately 26 servo sectors 212 are shown in FIG. 2 for ease of illustration. In implementation there are typically hundreds of servo sectors 212 evenly spaced about the circumference of the disk 102.

The servo sectors 212 divide a corresponding plurality of data wedges 216. The disk surface 103 also includes a plurality of concentric data tracks 220 which are spaced at a constant pitch $T_p$. As described above, the head 108 can reside over various locations of the disk 102. Data track address marks in each servo sector 212 provide encoded information corresponding to the location. The servo sector 212 may also include servo timing marks (STM) and fine circumferential position error signal (PES) servo burst marks. Although exemplary servo sector 212 information has been described, it should be recognized that the any format and data encoding scheme may be implemented.

A problem with the radially aligned servo sectors 212 is that they are not aligned with the arc segment 230 that the head 108 travels along between the inner diameter and the outer diameter of the disk 102. Specifically, the arc segment 230 corresponds to a circle concentric with the pivot axis of the actuator assembly 110 and having a radius corresponding to the length of the actuator arm 106. Thus, as the disk 102 rotates, the head 108 resides over successive servo sectors at a rate which varies and depends upon radial location. This can create seek time delays. According to preferred embodiments of the present invention, curvilinear servo sectors 212' are formed on a master disk (and data storage disks produced from the master). More preferably, the curvilinear servo sectors 212' are aligned with the arc segment 230 so that the head 108 encounters servo sectors independent from its radial position. The spacing, number and encoded information in the curvilinear servo sectors 212' can be the same as the radially aligned servo sectors 212. It is noted that FIG. 2 is an exemplary illustration. An actual disk surface 103 would not typically include both radially aligned and curvilinear servo sectors.

One mechanism for producing disks having curvilinear servo sectors is from a master disk having the desired servo sector pattern. The master disk provides a mold that, using conventional techniques, is used to make data storage disks.

A conventional master writing tool comprises an air bearing spindle onto which a glass master substrate is mounted. To write the master, the glass substrate is uniformly coated with photoresist. The photoresist can be exposed by an optical spot produced by a controlled laser. In conventional fashion, the exposed photoresist is developed and the spots are used to produce pits on the master disk.

The master writing tool includes a master clock signal which can be provided by a crystal oscillator. The master clock is used to generate sector, index and encoder pulses. The number of master clock cycles per disk revolution (CR) are defined as the product of the number of clock cycles per servo sector (CS) and the number of servo sectors per revolution (SR). The sector and index pulses are thus generated by dividing the master clock signal. Specifically, the sector pulses can be produced by dividing the master clock by CS, and the index pulses can be produced by dividing the sector pulses by SR. Additionally, encoder pulses are produced by dividing the master clock signal by a predetermined value. The spindle includes a precision angle encoder for determining the circumferential position on the master. The encoder pulses are used as a reference for the spindle encoder; i.e. the spindle motor is locked to the reference supplied by the master writing tool. The master writing tool thus generates master clock, index, and sector pulses for use by the controller 300, 500, 600, 700 electronics.

A complete bit map of the locations on the disk can be used to write information onto the master. Each bit position is separated by a constant angle such that the servo sector read-back signal frequency to be the same when the disk spins at a constant angular velocity, regardless of radial position. This means that the servo sectors, like the data wedges, are wedge shaped. The data near the disk OD has greater spacing than near the disk ID.

An R-Theta coordinate system can be used to represent the location of the data to be written onto the master. A typical optical media could contain $2^{16}$ tracks per data band, 6 sub-tracks per track to make the servo patterns, $2^8$ servo sectors per revolution and $2^{10}$ clock positions between servo sectors. A complete bit map would then be $12^{34}$ bits, or about 400 MB, which is large but could be implemented.

Figure 3:
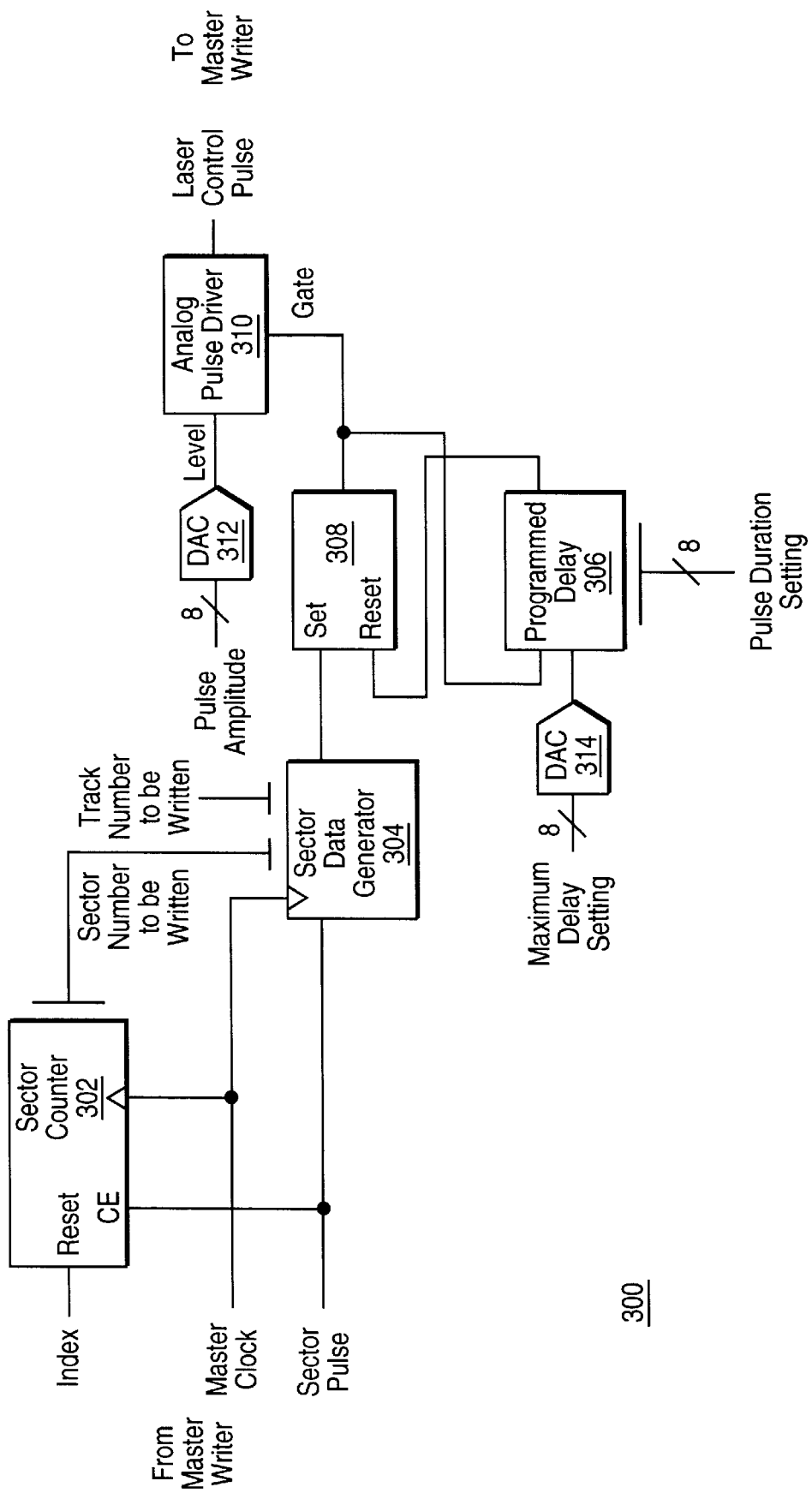
FIG. 3 is a block diagram illustrating an embodiment of a master writer controller for producing radially aligned servo sector patterns.

Referring now to the block diagram of FIG. 3, an embodiment of a master writer controller 300 for producing radially aligned servo sector patterns includes a sector counter 302, a sector data generator 304, a programmable delay 306, a flip-flop 308, an analog pulse driver 310, and a pair of digital to analog converters 312, 314.

The controller 300 receives the index, master clock, and sector pulse signals from the master writing tool and produces laser control pulses. The pulses drive a laser that exposes the photoresist according to the encoded servo sector information to be written onto the master. The sector counter 302 outputs a count for the current sector which is incremented at each sector pulse. Preferably, the sector counter 302 is a conventional synchronous counter that includes clock, reset and count enable (CE) inputs. The master clock signal is coupled to the clock input, the index pulse signals to the reset, and the sector pulse signal to the CE input to provide the appropriate sector count as incremented by the sector pulses. The index pulse indicates the completion of a disk revolution and causes the sector count to be reset.

The sector data generator 304 receives the current sector count from the sector counter 302, the current track number, the master clock signal, and the sector pulse. The current track number is a function of the number of disk revolutions. In its simplest form it can be a counter that starts at zero and increments each disk revolution. In a preferred alternative, to allow for multiple (e.g., i) passes per track, the track counter increments upon multiple disk revolutions. Thus, the track count would start at zero and increment each ith revolution. An additional revolution (where no data is written to the disk) may be added to ensure that the track count is not prematurely updated. There, the track number would increment each (i1) revolutions.

The sector data generator 304 produces an output corresponding to the encoded information to be provided along the relevant track in the relevant servo sector. The sector data generator 304 can be a memory with the encoded information addressed by the track and sector number. The output for each sector is triggered by the sector pulse, and the master clock signal is used to time the output of the encoded information within each sector. Ultimately, the entire master disk is written, starting with the outermost track and proceeding to the innermost track.

Collectively, the encoded information for each track and sector on the disk provides the servo sector pattern. A full bit map (e.g. 400 MB) of all of the locations on the disk is not required because the data wedges (the areas between the servo sectors) are not written for the master disk. This reduces the required memory by a factor of about 20 to about 20 MB for radially aligned servo sector patterns.

Although the sector data generator 304 preferably implements encoded information for the various sectors that is addressed as described above, various alternatives can be implemented for generating the encoded information. For example, a logic block that produces the encoded information based upon the current sector and track numbers can be implemented.

Still referring to FIG. 3, the output from the sector data generator 304 drives the flip-flop 308 which combines with the delay circuitry 306 to gate an analog pulse driver 310, which in turn drives the laser. The pulse width and amplitude can be controlled dependent upon the current track (or set of tracks, or any set of locations to be written). The pulses from the sector data generator 304 set the output of the flip-flop 308, which triggers the programmable delay circuitry 306 to reset the flip-flop output dependent upon the desired pulse width. The desired pulse width is controlled according to a duration setting (e.g., an 8-bit value) and a maximum delay setting provided through the DAC 314. Additionally, the amplitude of the pulses is controlled by a setting which determines the level produced by the analog pulse driver 310 through the DAC 312.

Unfortunately, to produce a curvilinear servo sector 212' such as the arc segment 230 type, the required number of bits in the map increases approximately 256 times to ensure that the information along the arc segments lines up smoothly. Additionally, the conventional coordinate scheme and data compression factor would not appear to be applicable to the curvilinear case since a given arc segment can span multiple radially aligned servo sectors. Thus, a bit map of approximately 100 GB would be required, which is not easily implementable. Additionally, the number of clock cycles per disk revolution would need to be increased by a factor of about 256 to provide the required resolution. This would require a slower disk speed, which would create a mastering throughput problem.

Figure 4:
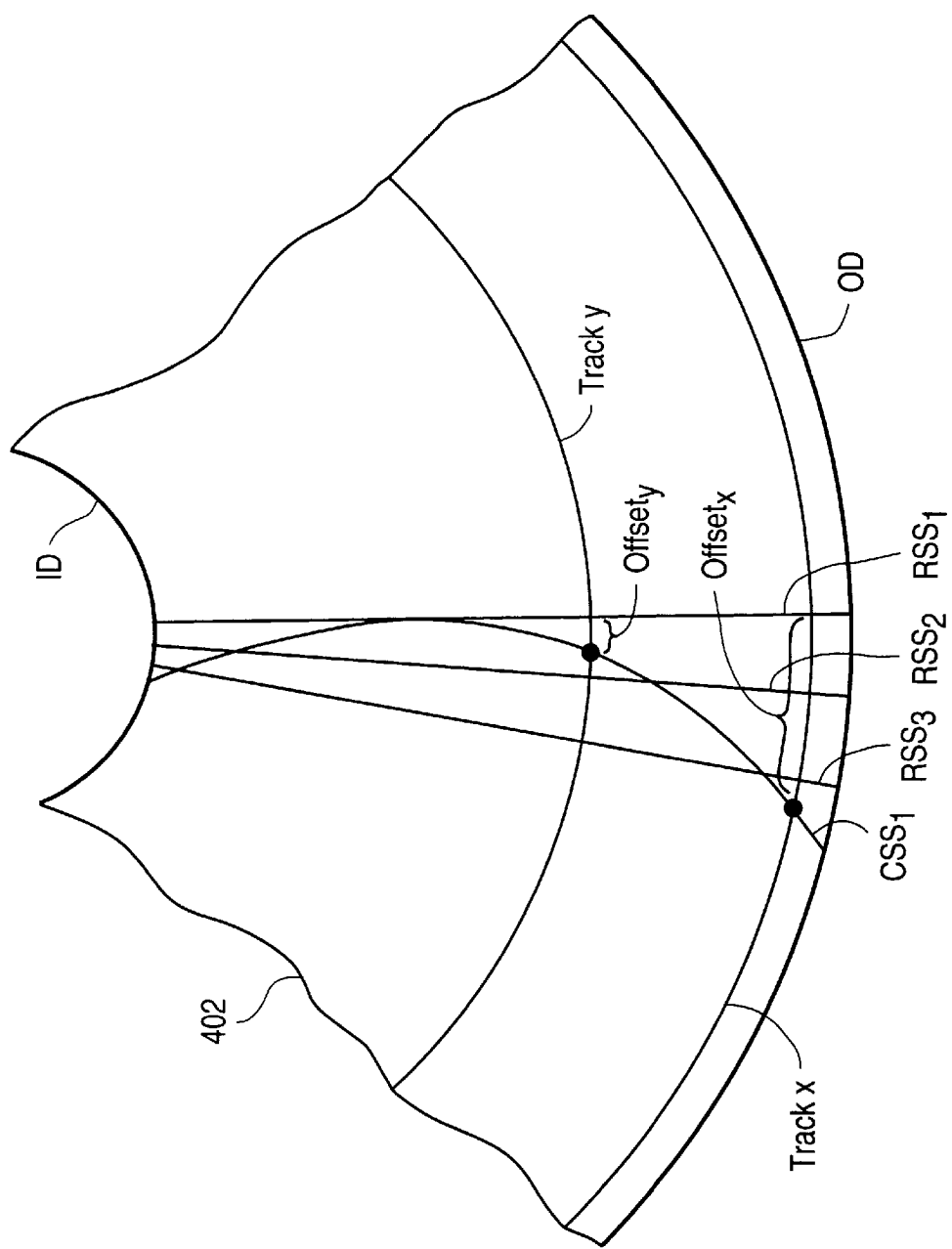
FIG. 4 is a schematic illustrating the relationship between radially aligned and curvilinear servo sector patterns.

According to certain embodiments of the present invention, a master writer controller 500, 600, 700 automatically produces curvilinear servo sector patterns from the compressed bit map data ordinarily used for radially aligned patterns by appropriately delaying the generation of laser control pulses so as to form the desired curvilinear shape. This is best understood with reference to FIG. 4, which is a schematic illustration of curvilinear (CSS) and radially aligned (RSS) servo sectors (shown as lines rather than wedges for ease of illustration) on a disk 402 having an ID and an OD. The disk 402 has a number of tracks, such as track x and track y. For a given radially aligned servo sector ($RSS_1$) and curvilinear servo sector ($CSS_1$) there will be an offset that depends upon radial location, which can be determined according to track number. Thus, along a first track (track x) there is a first offset ($offset_x$) and along a second track (track y) there is a second offset ($offset_y$) between the radially aligned (RSS) and curvilinear servo sectors (CSS).

The offset can be expressed as a delay corresponding to an amount of time for the disk 402 to rotate from the radially aligned servo sector ($RSS_1$) to the curvilinear servo sector (CSS1) along the given track. Additionally, the delay can be expressed in terms of the number of sectors, clock cycles and fractions of clock cycles between the radially aligned servo sector and the curvilinear servo sector. For example, for the $offset_x$ between the radially aligned servo sector RSS₁ and the curvilinear servo sector CSS₁ for track x, an appropriate delay for writing the servo sector data would be expressed as a delay of two sectors, the floor (rounded down) integer number of clock cycles between radially aligned servo sector RSS₃ and CSS₁ along track x, and any residual fractional clock cycles not accounted for by the numbers of sectors and clock cycles.

The fractional number of clock cycles allows increased resolution without multiplying the required clock signal. Thus, a 256 step programmable delay can provide 256 times the resolution at the same master clock speed. Of course some offsets, such as offset$_y$, might not traverse an adjacent sector boundary, so the number of sectors would be zero, and the remaining delay could be expressed as a number of clock cycles and fractional clock cycles.

Figure 5:
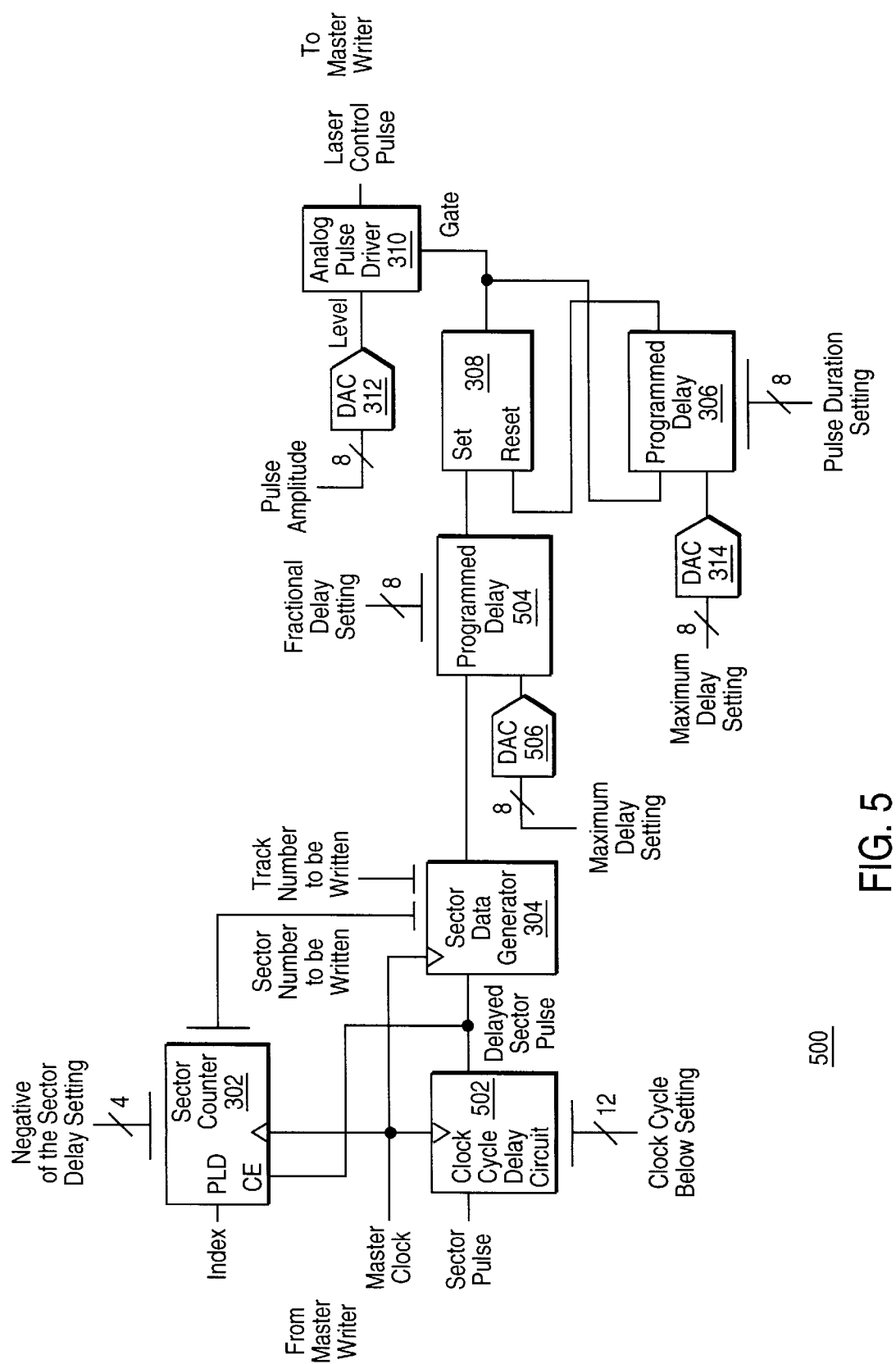
FIG. 5 is a block diagram illustrating an embodiment of a master writer controller for producing curvilinear servo sector patterns in accordance with the present invention.

Referring now to the block diagram of FIG. 5, an embodiment of a master writer controller 500 produces curvilinear servo sectors using compressed bit map data ordinarily used for radially aligned servo sectors by incorporating the delay between the radial reference and the curvilinear servo sector.

The master writer controller 500 includes a sector counter 302, sector data generator 304, programmable delay 306, flip-flop 308, analog pulse driver 310, and DACs 312, 314 having functionality similar to that described in connection with FIG. 3. However, the master writer controller 500 delays the generation of the laser control pulse according to the offset and corresponding delay between a curvilinear servo sector and a radially aligned counterpart for the relevant track.

Control settings corresponding to the number of sectors, integral clock cycles and fractional clock cycles are provided to the master controller 500. In addition to the clock, reset and CE inputs, the sector counter 302 includes a synchronous preload (PLD) input and data inputs for loading an initial count into the counter. The index pulses are coupled to the PLD input, and the sector delay setting is coupled to the data inputs. The index pulse thus causes the counter 302 to load the initial count provided by the data inputs. The sector delay setting is preferably an integer number of sectors between the reference and the curvilinear servo sector. It can be directly loaded as the negative value of the sector delay setting. Thus, if servo sector data along a track similar to track x in FIG. 4 was being written, the counter 302 would be preset to minus 2 (the negative of the sector delay setting) upon receipt of the index pulse. In one embodiment, the sector delay setting is a four bit value.

The clock cycle delay setting (e.g., 12 bits) provides an integer number of clock cycles by which the sector pulse is delayed. The clock cycle delay circuit 502 receives that setting as well as the unmodified sector pulse and produces a sector pulse that is delayed an integer number of master clock cycles as dictated by the clock cycle delay setting. Preferably, the clock cycle delay circuit 502 is a counter having data inputs to load the clock delay setting, a clock input connected to the master clock, an input that receives the sector pulse, and an output connected to the sector counter count enable as well as the sector data generator 304. The clock cycle delay circuit 502 is loaded with the clock cycle delay setting, and counts down from that setting upon receipt of the sector pulse. When the count reaches zero, the clock cycle delay circuit 502 outputs a pulse delayed according to the clock cycle delay setting. Such a delayed sector pulse is output for each received sector pulse. Thus, the clock cycle delay circuit 502 outputs a delayed sector pulse, with the delay being the integer number of master clock cycles defined by the clock cycle delay setting.

The delayed sector pulse is received by the clock enable input of the sector counter 302 as described above. The sector counter 302 and clock cycle delay circuit 502 thus combine to produce the sector number delayed according to the sector delay and clock cycle delay settings.

The sector data generator 304 receives the sector count (as modified by the sector delay setting and the clock cycle delay setting), the current track number, the master clock signal, and the delayed sector pulse. The sector data generator 304 preferably stores the encoded information for the servo sectors, addressed by the servo sector and track number and triggered by the (now delayed) sector pulse and master clock as described above. Thus, the sector data generator 304 produces a pulse stream corresponding to the encoded information to be provided along the relevant track in the relevant servo sector, with the sector and integer clock cycle portions of the delay automatically incorporated into its output.

The residual delay between the radially aligned servo sector and the curvilinear servo sector (the portion not accounted for by the sector and clock cycle delay settings) is provided as a fractional clock delay setting. Specifically, the programmable delay 504 receives a value for the fractional delay, and appropriately delays the output received from the sector data generator 304. For an 8 bit fractional clock delay setting, the delay resolution is the maximum delay divided by 256. The maximum delay is provided to the programmable delay 504 through DAC 506. The laser control pulses are produced by the analog pulse driver 310 with a controllable pulse amplitude and width as described for the controller 300 of FIG. 3. The residual delay allows for fine positioning of marks without having to increase the number of clock cycles per disk revolution. Thus, multiplied resolution (e.g. 256x) with throughput substantially identical to that for the conventional radially aligned case of FIG. 3 is provided.

The master writer controller 500 embodiment of FIG. 5 can be implemented using 5 bytes of control information as follows: pulse amplitude for the current track (8 bits), pulse width or duration for the current track (8 bits), sector delay setting (4 bits), clock cycle delay setting (12 bits), and residual fractional clock delay setting (8 bits). With $2^{16}$ tracks and 6 passes per track, this would require about 2 MB of control information. The control information is stored in a master writer resident data table, preferably in an electrically erasable electrically programmable memory (EEPROM). Also, the data table is preferably addressed by the track number (or, where multiple tracks are written using the same control information, a number (e.g., i) that corresponds to sets of tracks). The pulse parameters (width, amplitude) are also addressed by the track number along with the sector, clock and residual delay settings.

The amount of control information can be reduced by incorporating a piece-wise linear approximation of the arc segment. This allows for calculation of the residual delay as a function of a base delay and a delta delay over each linear piece. If the linear approximation is over 8 tracks, then the amount of control information can be reduced by a factor of about 40 to about 50 KB.

Figure 6:
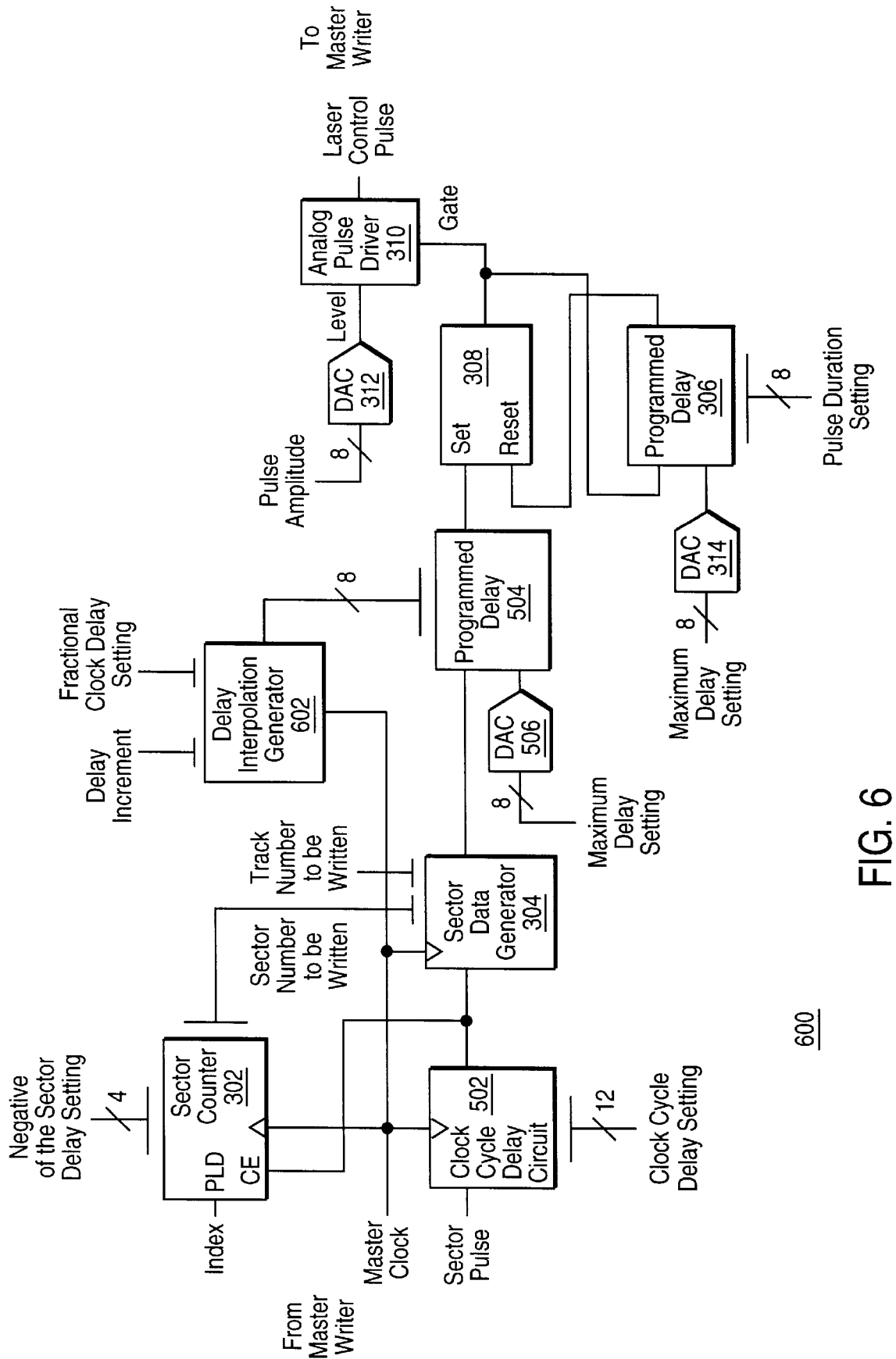
FIG. 6 is a block diagram illustrating an embodiment of a master writer controller for producing curvilinear servo sector patterns and incorporating linear interpolation in accordance with the present invention.

Referring now to the block diagram of FIG. 6, an embodiment of a master writer controller 600 for producing curvilinear servo sector patterns and incorporating linear interpolation includes a sector counter 302, sector data generator 304, programmable delay 306, flip-flop 308, analog pulse driver 310, DACs 312, 314, clock cycle delay circuit 502, programmable delay 504, and DAC 506 which are connected and have the functionality described for the controller 500 embodiment of FIG. 5 (although the sector delay, clock delay and residual delay settings are adjusted to prevent negative values in the linear interpolation scheme). Additionally, the controller 600 includes a delay interpolation generator 602 which receives a delay increment and base fractional clock delay setting and produces a fractional delay value which is received by the programmable delay 504. Specifically, for a relevant set of tracks (e.g., for a current 8 track set corresponding to the linear piece), the delay interpolation generator receives a delay increment and a base fractional clock delay setting. The delay increment corresponds to the slope of the line (in the piece wise approximation) for the current linear piece, and the base fractional clock delay setting is the delay corresponding to one end of the line. The delay interpolation generator 602 then uses conventional calculations to update the fractional delay value for each current track. For the first track, the value may be the base fractional delay value. For successive tracks, the value may be the base fractional delay value, adjusted according to the delay increment.

It should be noted that the accumulated fractional delay (after numerous interpolation cycles) may exceed a full clock delay. Thus, the resolution of the fractional delay can be defined to allow representation of more than a full clock cycle as a fraction. This can be done by providing a slightly decreased delay increment resolution. For example, for implementation with a fractional delay having 8-bits of resolution, the delay increment can be approximately a clock period divided by 200.

The programmable delay 504 implements the fractional delay setting that is provided to it as described with reference to FIG. 5, and the analog pulse driver 310 generates laser control pulses having a controllably defined amplitude and width as described with reference to FIG. 3. Again, the control information can be provided in a data table stored in a memory, preferably a EEPROM.

One remaining problem is the amount of time to write a master disk. For $2^{16}$ tracks with 6 passes per track and 2 master writer revolutions per pass, it could take approximately 11 hours to master write the disk at 1200 RPM. This time can be reduced by providing a multiple beam master writing machine. For example, two beams can be provided. However, since the each of the two beams will be at a different radial locations, they will each have a slightly different offset (which can be fully reflected by variance in the residual delay portion represented by a clock fraction). Also, the width and amplitude of the laser control pulse may vary between the two beams.

To accommodate these requirements, much of the circuitry from the master writer controller 600 of FIG. 6 is replicated so that the residual delay and laser control pulse parameters can be independently controlled. Referring now to the block diagram of FIG. 7, an embodiment of a master writer controller 700 having dual laser control pulse generation comprises a sector counter 302, sector data generator 304, programmable delay 306, flip-flop 308, analog pulse driver 310, DACs 312,314, clock cycle delay circuit 502, programmable delay 504, DAC 506 and delay interpolation generator 602 (less the additional output) having substantially the same connections and functionality of the master writer controller 600 embodiment of FIG. 6. The master writer controller 700 further includes two outputs for the delay interpolation generator 602, one for the first beam and one for the second beam. Additionally, the programmable delay 306, flip-flop 308, analog pulse driver 310, DACs 312,314, programmable delay 504 and DAC 506 that are used to generate the laser control pulse for beam #1 are replicated to generate the laser control pulse for beam #2 (shown as 306', 308', 310', 312', 314', 504', 506'). The replicated circuitry 306', 308', 310'312', 314'504', 506' is connected and functions in the same fashion. However, the two sets can receive different fractional clock cycle values from the delay interpolation generator 602, and can produce a laser control pulse having different amplitude and/or width. The different fractional clock cycle values are dependent upon the location of beam #1 versus beam #2, which have a linear relationship based upon the local linear piece. The pulse width for beam #1 depends upon the pulse duration setting input to programmable delay 306, whereas that for beam #2 depends upon the pulse duration setting input to programmable delay 306'. Similarly, the pulse amplitude for beam #1 depends upon the pulse amplitude setting input to the programmable delay 306 through DAC 314, whereas the amplitude for beam #2 depends upon the setting input to programmable delay 306' through DAC 314'.

With two beams, such as those generated using the master writer controller 700, the master writing can be done with 2 passes per track instead of 6, which can cut the master writing time down to about 3.7 hours.

Figure 7:
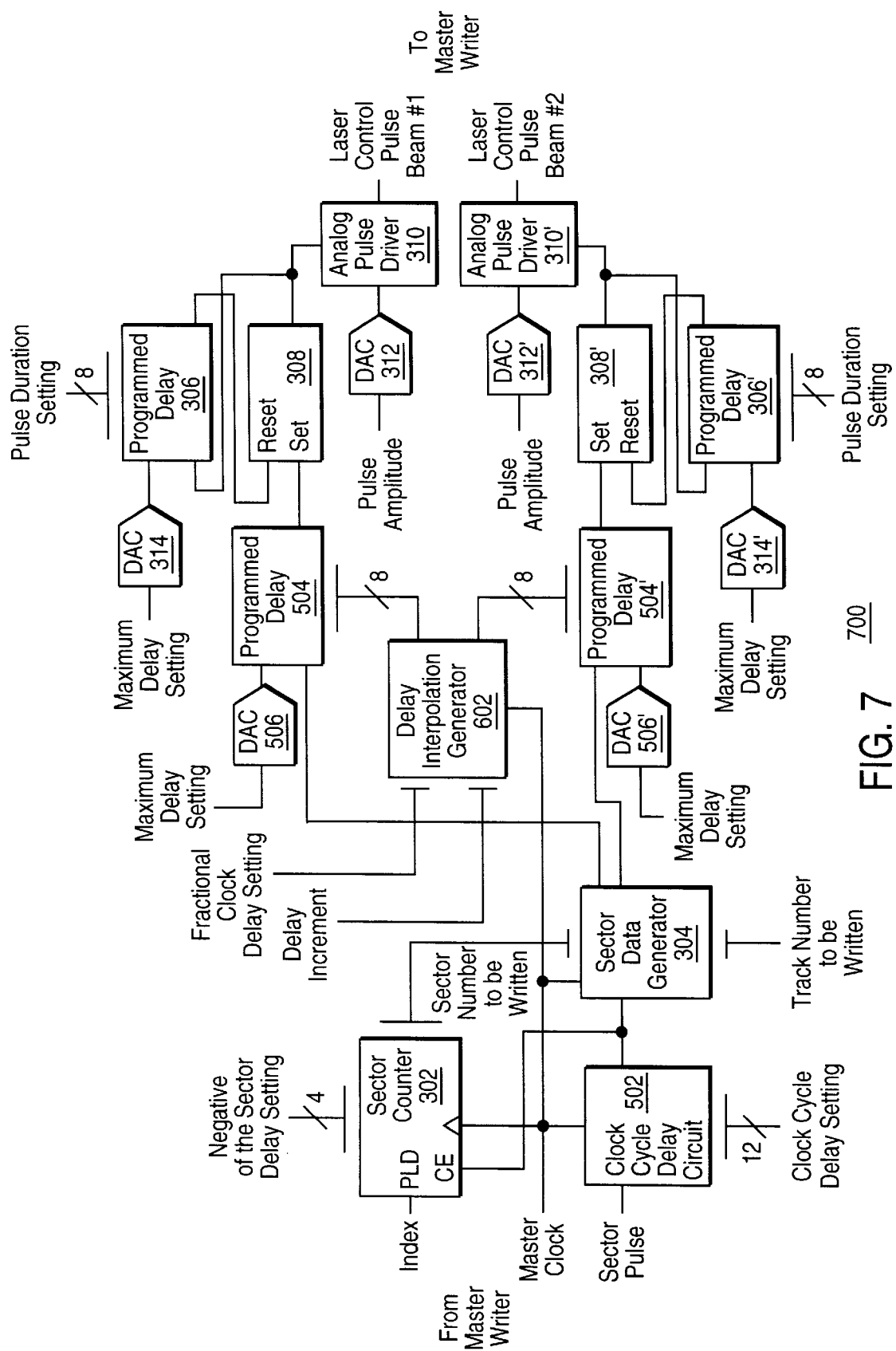
FIG. 7 is a block diagram illustrating an embodiment of a master writer controller having dual laser control pulse generation in accordance with the present invention.

Although various embodiments will become evident to the artisan once instructed by this description, the master writer controller 700 embodiment of FIG. 7 can be implemented using 8 bytes of control information as follows: pulse amplitude for beam 1 along the current track (8 bits), pulse width or duration for beam 1 along the current track (8 bits), pulse amplitude for beam 2 along the current track (8 bits), pulse width or duration for beam 2 along the current track (8 bits), sector delay setting (4 bits), clock cycle delay setting (12 bits) (sector delay and clock cycle delay settings can be provided with 2 bytes), residual fractional clock delay setting (8 bits), and delay increment (8 bits).

Figure 12:
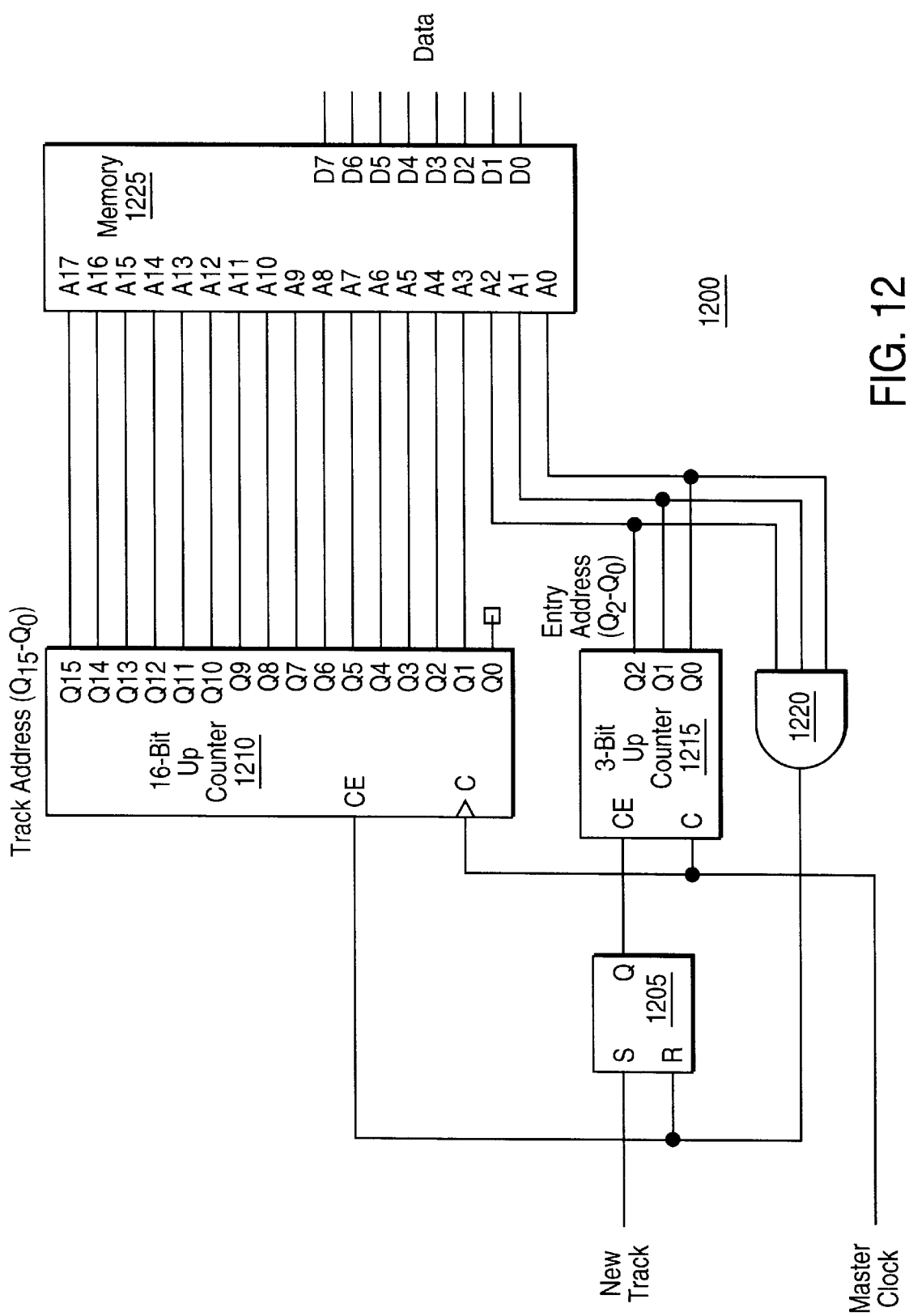
FIG. 12 is a schematic diagram illustrating an embodiment of control settings generating circuitry constructed in accordance with the present invention.

Referring now to the schematic diagram of FIG. 12, an embodiment of control settings generating circuitry 1200 that generates the master writer control settings is shown to include a flip flop 1205, counter 1210, counter 1215, AND gate 1220, and memory 1225. The memory 1225 is preferably a conventional flash EPROM or EEPROM that is used as a non-volatile memory for storing the master writer control settings. The control settings generating circuitry 1200 of FIG. 12 is preferably used in conjunction with master writer controller embodiments that implement eight bytes of control setting information.

The memory 1225 provides the control settings in a data table. With the embodiment of FIG. 12, the control settings are stored sequentially, with eight bytes of control setting information corresponding to each current set of tracks. In the described embodiment, each set of control settings is used for two tracks. Thus, in the data table there is a set of eight control settings that are used for tracks 0 and 1, followed by a set of eight control settings for tracks 2 and 3, and so on. The three least significant memory 1225 address bits (A2–A0) address the eight entries within each set of control settings. The fifteen most significant memory 1225 address bits (A17–A3) correspond to the fifteen most significant bits (Q15–Q1) in the sixteen bit track count.

A new track pulse initiates a read of eight entries in the data table, and those eight entries are used as the master writer control settings for the current track. The new track pulse is generated upon the occurrence of a predetermined number of index pulses. The number of index pulses per new track pulse depends upon the number of passes that are used to write each track. Typically, a new track pulse will occur every 2nd or 6th index pulse, since 2 and 6 pass per track writing is contemplated.

In the embodiment of FIG. 12, each control setting entry is an eight bits data output (D0–D7) from the memory 1225. The index pulse enables counter 1215 (which is preferably a 3 bit counter) through flip flop 1205, and the counter 1215 increments the values on the address lines A0–A2 through the first eight addresses (000 through 111). The track address (Q0–Q15) is incremented after the eight bytes are read out, since the AND gate 1220 output is connected to the count enable of counter 1210 (preferably a 16 bit counter). The AND gate 1220 output also resets the flip flop 1205. Upon receipt of the next index pulse, counter 1210 is preset to the next track address, and counter 1215 is enabled to read out the next eight control setting bytes. Since counter 1210 output QO is ignored, the memory 1225 address is effectively updated for every 2nd track.

The control settings generating circuitry 1200 can be used with embodiments requiring less than eight bytes of control settings per track by ignoring superfluous address entries, or such circuitry 1200 could be easily modified to change the counting scheme. Additionally, embodiments where control settings are used for different track multiples can be easily implemented. For example, a different set of control settings can be used for each track by using the least significant bit QO from the counter 1210 to address the memory 1225.

Figure 8:
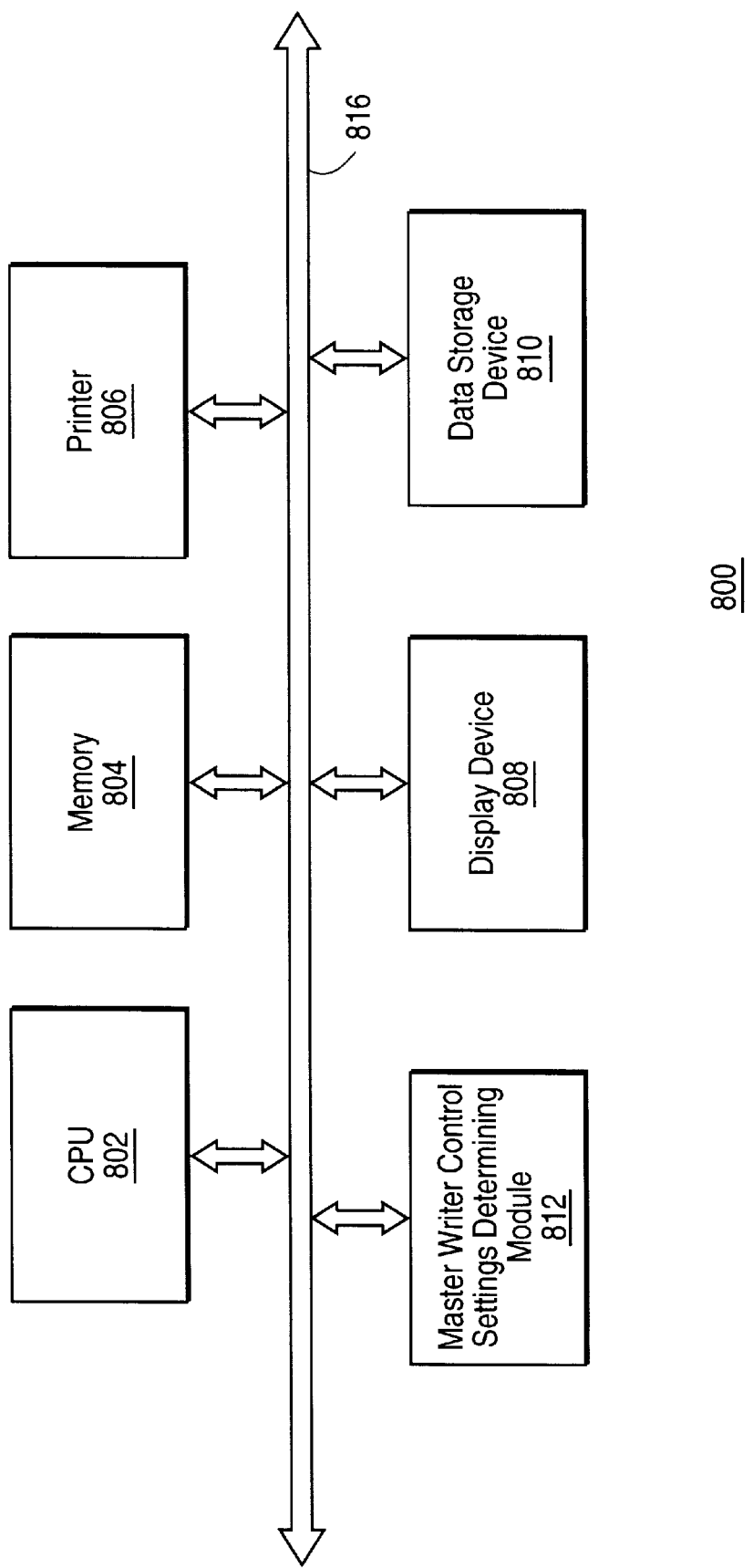
FIG. 8 is a block diagram illustrating a computer including an embodiment of a master writer control settings module in accordance with the present invention.

The above embodiments implement delay settings for controlling a master writer to produce curvilinear servo sectors. These delay settings can be stored in a memory provided with the master writer. Other embodiments of the present invention are used to produce the delay settings that will be stored in such a memory. Referring now to the block diagram of FIG. 8, a computer 800 including an embodiment of a master writer control settings determining module 812 includes a CPU 802, memory 804, printer 806, display device 808, and data storage device 810 connected in a conventional architecture by a bus 816. The CPU 802 is a conventional unit for executing instructions stored in memory 804 or elsewhere, and the execution of such instructions produces the functionality within and among the various modules 802–812 described below, including the master writer control settings determining module 812.

Figure 9:
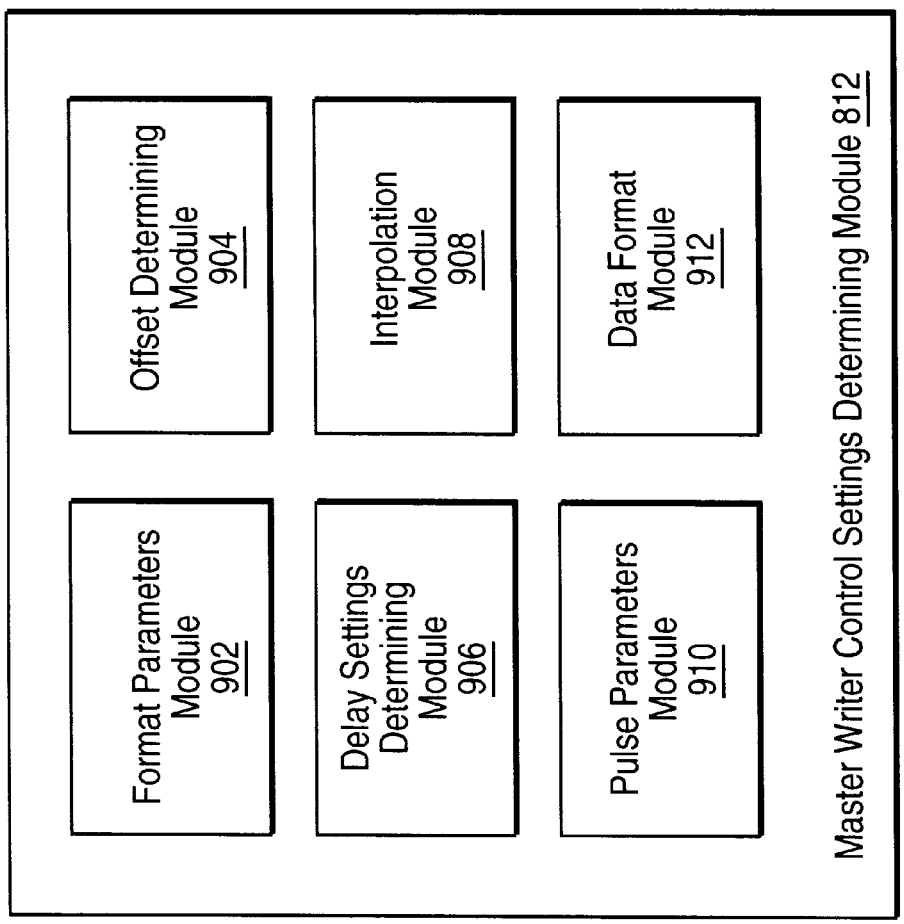
FIG. 9 is a block diagram illustrating an embodiment of a master writer control settings module in accordance with the present invention.

Referring now to the block diagram of FIG. 9, an embodiment of a master writer control settings determining module 812 includes a format parameters module 902, offset determining module 904, delay settings determining module 906, interpolation module 908, pulse parameters module 910 and data format module 912. Preferably, the master writer control settings determining module 812 and its various modules 902–912 are implemented in software. However, the functionality of the modules 812, 902–912 can also be implemented in hardware or firmware, or any combination of software, hardware and firmware.

The format parameters module 902 receives and stores format parameters that are used to determine the geometrical relationship between a reference radially aligned servo sector and a curvilinear servo sector to, and to determine the corresponding offsets, delays, and delay parameters between servo sector and a curvilinear servo sector. The offset determining module 904 receives the format parameters and determines the offset between the radially aligned servo sector and the curvilinear servo sector. The delay settings determining module 906 receives the offset information and format parameters and determines delay parameters used to control a master writer controller. For example, the delay parameters can include a sector delay value, a clock delay value and a residual fractional clock delay. Where desired, the interpolation parameter module 908 provides a piecewise linear approximation of the curvilinear servo sector, adjusts the delay parameters, and produces corresponding master writer control settings. The pulse parameters module 910 determines the pulse width and amplitude corresponding to one or more laser control pulse streams. Typically, the pulse width and amplitude will depend upon the radial location of the beams. This means that a selected pulse width and amplitude can be addressed by tracks or sets of tracks. Finally, the data format module 912 converts the control settings produced by the delay settings determining module 906, interpolation module 908 and pulse parameters module 910 into a format implemented by a master writer controller 500, 600, 700. For example, the data format module 912 preferably receives the control settings and formats the data and produces bytes of control data.

Figure 10:
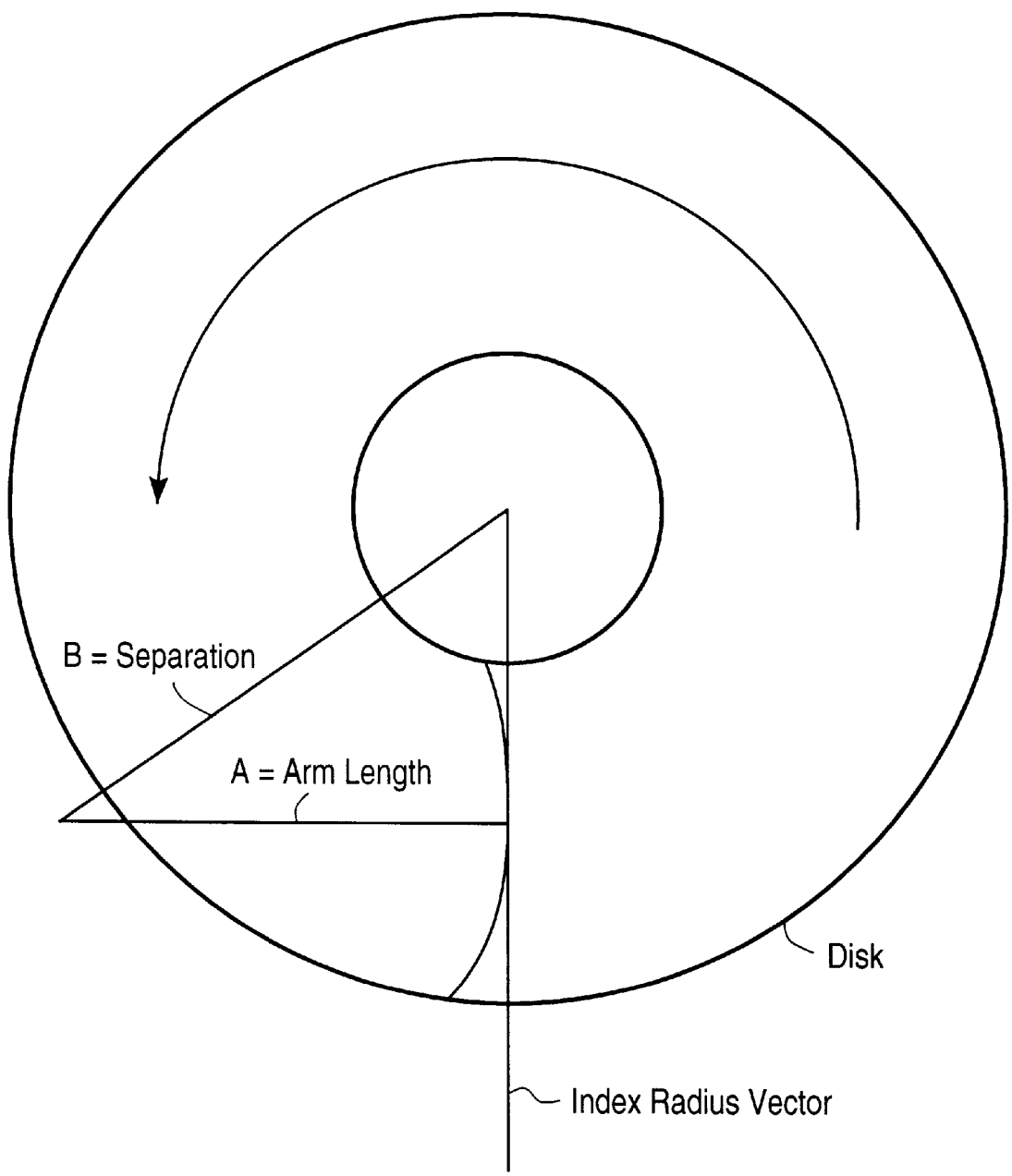
FIG. 10 is a schematic illustrating geometrical information used to produce a curvilinear servo sector.

Referring now to the schematic of FIG. 10 along with FIG. 9, an embodiment of the master writer control settings determining module 812 that produces control settings for generating an arc segment shaped servo sector pattern is described. As illustrated in the schematic, the arc segment can be generally defined from the distance between the pivot points of the actuator arm and the disk spindle pivot point ("separation B") and the distance from the actuator arm pivot to the data location on the media ("arm length A"). The index radius vector for the arc segment is a radially aligned reference axis that intersects the arc segment at a point where the radial axis is perpendicular to the actuator arm. The offset between the radial axis and the arc segment is a function of an independent variable corresponding to the track number, starting with track "0" at the disk OD and increasing through the usable data zone and the start up zone. Although separate offsets can be determined for each track, the independent variable can correspond to a plurality of tracks.

For the arc segment embodiment, the format parameters module 902 can receive and store the exemplary parameters illustrated in Table I below.

TABLE I

| Format Parameter | Description |
|---|---|
| A = 66789 | Actuator pivot to data location (um) |
| B = 76937 | Spindle pivot to actuator pivot (um) |
| TP = 0.71 | Track pitch (um) |
| OD = 64600 | Radius of track 0 (um) |
| First_SU_Zone_Track = 52960 | First start-up zone track |
| Last_Track = 55776 | Last start-up zone track |
| s = 2 | Tracks per ROM table entry |
| Pass = 2 · s | Servo writer passes per ROM table entry |
| SR = 255 | Servo sectors per revolution |
| CS = 1040 | Clock cycles per servo sector |
| CR = CS · SR | Clock cycles per revolution |
| DC = 160 | Delays per clock cycle |
| DS = DC · CS | Delays per sector |
| DR = DC · CR | Delays per revolution |
| Mult = $2^2$ | Multiplier for delta delay scaling |

The delays per cycle DC and multiplier for delta delay scaling can be defined so as to keep the maximum number of delays, interpolation values and delta values in implementable ranges (e.g. 256 values for 8 bit implementations). Referring to the flow chart of FIG. 11 along with FIGS. 9–10, an embodiment of a method 1100 for determining parameters which control a master writer to produce curvilinear servo sectors indicates the step 1102 of determining format parameters.

The offset determining module 904 accesses the appropriate format parameters and calculates the offsets between the radially aligned reference axis and the arc segment, addressed according to the independent variable "n." This will ultimately produce a data table of control settings having "n" address entries that each correspond to "s" tracks. Starting with entry 0, the offset between the radially aligned reference and the arc segment is determined for each entry [0 . . . n]. This is also illustrated as steps 1104–1106 in FIG. 11.

Preferably, the offset determining module 904 implements the following equations 1–4.

$$\text{Last} = \frac{\text{Last\_Track}}{s} \quad \text{(Equation 1)}$$

$$n = 0 \ldots \text{Last} \quad \text{(Equation 2)}$$

$$R_n = OD - n \cdot s \cdot TP \quad \text{(Equation 3)}$$

$$\text{Offset}_n = R_n \cdot \left[ a\cos\left( \frac{\text{floor}(\sqrt{B^2 - A^2})}{B} \right) - a\cos\left[ \frac{(R_n)^2 + B^2 - A^2}{2 \cdot R_n \cdot B} \right] \right] \quad \text{(Equation 4)}$$

Equations 1 and 2 determine that number of iterations (and corresponding number of memory data table addresses), equation 3 determines the radial location on the disk according to independent variable n, and equation 4 determines the offset value according to independent variable n.

Figure 11:
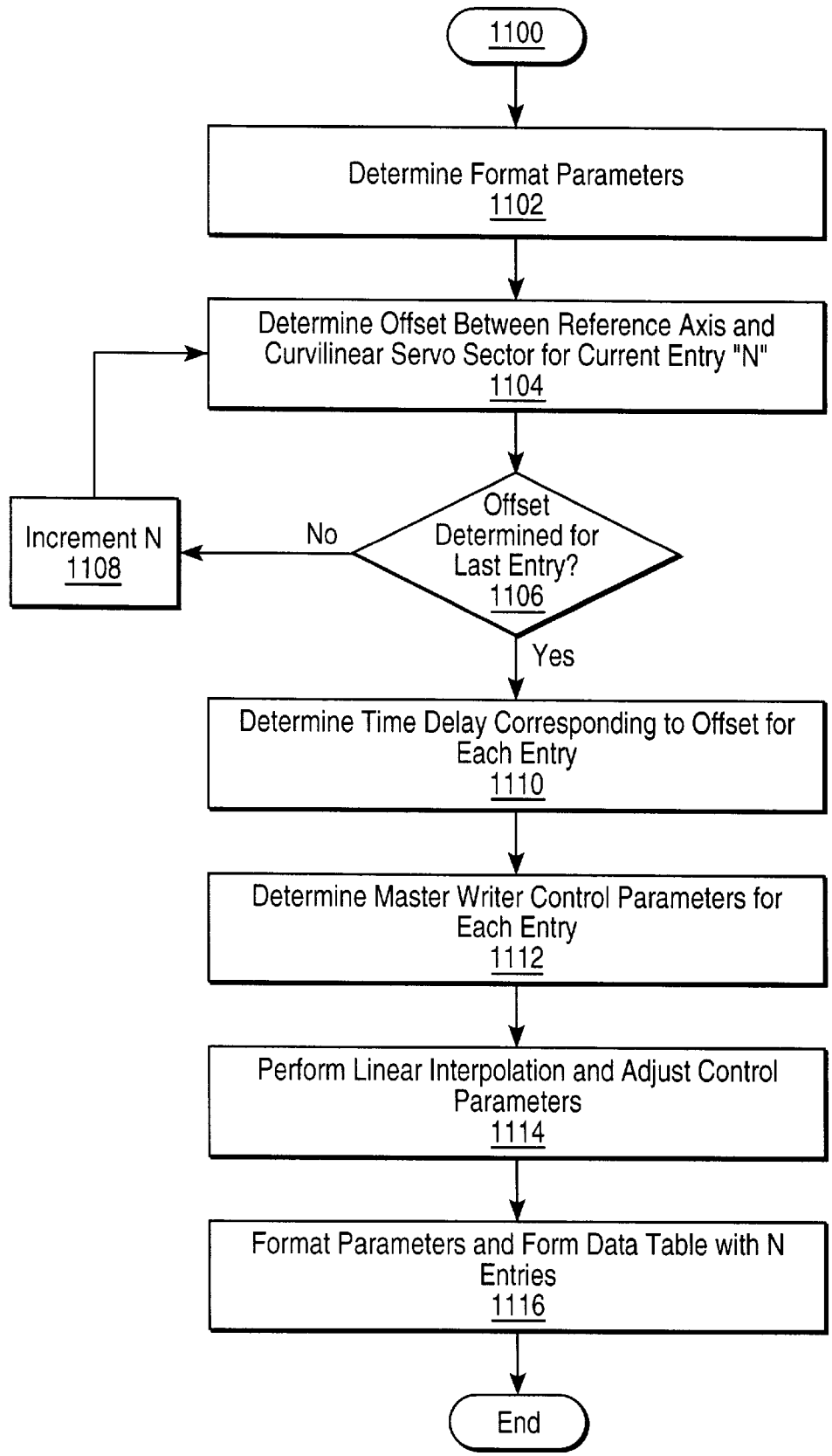
FIG. 11 is a flow chart illustrating an embodiment of a method for determining parameters for controlling a master writer to produce curvilinear servo sectors in accordance with the present invention.

The delay settings determining module 906 receives the offset values from the offset determining module 904 and uses those values along with selected format parameters to determine master writer control settings such as the number of sectors, number of clock cycles and residual fractional clock cycles required to represent a given offset. The control settings are addressed by independent variable n. Steps 1110 and 1112 in FIG. 11 illustrate the determination (step 1110) of the time delay (which, per the exemplary equations, can be a determination of a number of fixed "delays") corresponding to the offset for each entry and the determination (step 1112) of the master writer control settings for each entry (which, per the exemplary equations, can be represented in sector, clock and residual delay values).

Preferably, the delay settings determining module 906 implements the equations in Table II to determine the delay parameters.

TABLE II

| Equation | Number | Description |
|---|---|---|
| $XD_n = \dfrac{2 \cdot \pi \cdot R_n}{DR}$ | Equation 5 | Determines the distance between delay increments |
| $\text{Delay}_n = \dfrac{1}{\text{Mult}} \cdot \text{floor}\left( \dfrac{\text{Mult}}{XD_n} \cdot \text{Offset}_n \right)$ | Equation 6 | Provides offset as a function of delays that are truncated to output precision |
| $NS_n = \text{floor}\left( \dfrac{\text{Delay}_n}{DS} \right)$ | Equation 7 | Calculates the number of sectors needed to represent the delay |
| $NS_n = \text{floor}\left( \dfrac{\text{Delay}_n - DS \cdot NS_n}{DC} \right)$ | Equation 8 | Calculates the number of clock cycles needed to represent the remaining delay |
| $ND_n = \text{floor } \text{Delay}_n - DS \cdot NS_n - DC \cdot NC_n$ | Equation 9 | Calculates the residual delay |

The master writer control settings produced by the delay settings determining module 906 could be used with a master writer controller 500 that does not implement linear interpolation of the arc segment. Alternatively, the parameters can be adjusted for use with a master writer controller 600, 700 that implements linear interpolation. Preferably, the interpolation module 908 implements equations 10–12 illustrated in Table III to compute the interpolation constant.

TABLE III

| Equation | Number | Description |
|---|---|---|
| $q0_n = DS \cdot NS_n + DC \cdot NC_n + ND_n$ | Equation 10 | Determine delay at point n |
| $q1_n = DS \cdot NS_{n+1} + DC \cdot NC_{n+1} + ND_{n+1}$ | Equation 11 | Determine delay at point n + 1 |
| $\Delta_n = \text{floor}\left[ (q1_n - q0_n) \cdot \dfrac{\text{Mult}}{\text{Pass}} \right]$ | Equation 12 | Determine interpolation constant, max($\Delta$) = 99, min($\Delta$) = −50. |

As described above, "mult" is preferably adjusted to keep $\Delta_n$ in an implementable range such as [−128,127]. Once the interpolation parameters are determined, the interpolation parameter module 908 adjusts the sector delay (NS), clock delay (NC), and residual delay (ND) values to eliminate any negative interpolation values. This is also illustrated as step 1114 in the flow chart of FIG. 11. Preferably, the interpolation parameter module 908 implements equations 13–16 in Table IV below to eliminate negative values.

TABLE IV

| Equation | Number | Description |
| --- | --- | --- |
| $\text{Next}_n = ND_n + \frac{\text{Pass}}{\text{Mult}} \cdot \Delta_n$ | Equation 13 | Use interpolation constant to predict the delay at n + 1 |
| $\Delta NC_n = \text{if}\left(\text{Next}_n < 0, \text{floor}\left(\frac{\text{Next}_n}{DC}\right), 0\right)$ | Equation 14 | $\Delta NC_n$ is made a negative integer if $\text{Next}_n$ is negative, otherwise it is set to 0. |
| $\text{Next}'_n = \text{Next}_n - DC \cdot \Delta NC_n$ | Equation 15 | $\text{Next}'_n$ provides positive value. |
| $\Delta NS_n = \text{if}(NC_n + \Delta NC_n < 0, 1, 0)$ | Equation 16 | If the correction $\Delta NC_n$ for NC becomes negative, then add a sector's worth of clocks to NC |

Finally, the interpolation module 908 adjusts the sector, clock, and residual delay values using the following equations 17–19. The parameter DC can be adjusted to keep ND in the implemented range.

$$ND_n = ND_n - DC \cdot \Delta NC_n \quad \text{Equation 17}$$

$$NC_n = NC_n + \Delta NC_n + CS \cdot \Delta NS_n \quad \text{Equation 18}$$

$$NS_n = NS_n + \Delta NS_n \quad \text{Equation 19}$$

The master writer control settings produced by the delay settings determining module 906 or the interpolation module 908 are received by the data format module 912 which uses conventional routines to format the values as, for example, a series of bytes. Each set of control settings (in byte form) can be provided in a data table that is addressed according to the independent variable n. Formatting of the values and provision of the data table is illustrated as step 1116 in FIG. 11. Preferably, the data table is provided in ROM, most preferably in a master writer EEPROM. The data format module 912 can also receive master writer control settings corresponding to the width and amplitude of pulses which are provided by the pulse parameter module 910. The pulse parameters are also addressed by the independent variable n such that they are a function of the radial position on the disk. Thus, for example, the pulse width can be controlled to produce a range between approximately 35 and 290 nanoseconds dependent upon radial position (wider pulses near the OD), and the pulse amplitude can be similarly controlled to produce a range between approximately 0 and 4095 mV (with higher amplitudes near the OD). The pulse width and amplitude can be a simple linear function of the independent variable n.

The above description is included to illustrate the operation of the preferred embodiments and is not meant to limit the scope of the invention. From the above discussion, many variations will be apparent to one skilled in the art that would yet be encompassed by the spirit and scope of the present invention. For example, although examples of the number of bits used for various master writer controller settings are provided, it will be recognized that the number may vary. Additionally, alternative master writer controllers may implement different control settings to incorporate the offset into the generation of the curvilinear servo sector pattern. For example, a master writer controller may omit the sector counter in favor of a servo sector pattern bit map that is addressed differently, such as by track number only. This embodiment would omit the servo sector delay setting. Other embodiments will be recognized. The scope of the invention is to be limited only by the following claims.

What is claimed is:

1. A method for determining settings for controlling a master writer to produce curvilinear servo sector patterns on a master disk, the method comprising:
    determining a first offset from the distance between a reference axis and a curvilinear servo sector along a first track on the master disk;
    determining a second offset from the distance between the reference axis and the curvilinear servo sector along a second track on the master disk, the second offset having a different value from the first offset;
    using the first offset to determine a first set of master writer control settings for writing information to the curvilinear servo sector along the first track; and
    using the second offset to determine a second set of master writer control settings for writing information to the curvilinear servo sector along the second track.

2. The method of claim 1, further comprising determining a first delay corresponding to the first offset which provides the amount of time for the master disk to rotate from the reference axis to the curvilinear servo sector along the first track;
    determining a second delay corresponding to the second offset which provides the amount of time for the master disk to rotate from the reference axis to the curvilinear servo sector along the second track; and
    determining the first and second sets of master writer control settings using the first and second delays.

3. The method of claim 2, wherein the first and second sets of master writer control settings correspond to at least one of the number of sectors, clock cycles and fractions of clock cycles between the reference axis and the curvilinear servo sector along the respective first and second tracks.

4. The method of claim 1, wherein the first and second sets of master writer control settings correspond to at least one of the number of sectors, clock cycles and fractions of clock cycles between the reference axis and the curvilinear servo sector along the respective first and second tracks.

5. The method of claim 1, wherein the reference axis is aligned with the radius of the master disk.

6. An apparatus for determining parameters for controlling a master writer to produce curvilinear servo sector patterns on a master disk, the apparatus comprising:
    a format parameters module, for providing a reference axis that is aligned with the radius of the master disk;
    an offset determining module, in communication with the format parameters module, for determining a first offset between the reference axis and a curvilinear servo sector along a first track on the master disk, and determining a second offset between the reference axis and the curvilinear servo sector along a second track on the master disk, the second offset having a different value from the first offset; and a delay settings determining module, in communication with the offset determining module, for using the first offset to determine a first set of master writer control settings for writing information to the curvilinear servo sector along the first track, and using the second offset to determine a second set of master writer control settings for writing information to the curvilinear servo sector along the second track.

7. The apparatus of claim 6, wherein the delay settings determining module determines a first delay corresponding to the amount of time for the master disk to rotate from the reference axis to the curvilinear servo sector along the first track, determines a second delay corresponding to the amount of time for the master disk to rotate from the reference axis to the curvilinear servo sector along the second track, and determines the first and second sets of master writer control settings using the first and second delays.

8. The apparatus of claim 7, wherein the first and second sets of master writer control settings correspond to at least one of the number of sectors, clock cycles and fractions of clock cycles between the reference axis and the curvilinear servo sector along the respective first and second tracks.

9. The apparatus of claim 6, wherein the first and second sets of master writer control settings correspond to at least one of the number of sectors, clock cycles and fractions of clock cycles between the reference axis and the curvilinear servo sector along the respective first and second tracks.

10. A method for determining parameters for controlling a master writer to produce curvilinear servo sector patterns on a master disk, the method comprising:

providing a reference axis;

determining an offset between the reference axis and a curvilinear servo sector; and determining at least one master writer control setting based upon the offset between the reference axis and the curvilinear servo sector.

11. An apparatus for determining parameters for controlling a master writer to produce curvilinear servo sector patterns on a master disk, the apparatus comprising:

a format parameters module, for providing a reference axis;

an offset determining module, in communication with the format parameters module, for determining an offset between the reference axis and a curvilinear servo sector; and a control settings determining module, in communication with the offset determining module, for determining at least one master writer control setting based upon the offset between the reference axis and the curvilinear servo sector.

12. An apparatus for writing curvilinear servo sector patterns on a master disk, the apparatus comprising:

a sector addressing circuit, for outputting a servo sector number that incorporates an offset between a reference axis and a curvilinear servo sector; and a sector data generator, coupled to the sector addressing circuit, for receiving the servo sector number and outputting servo sector data delayed according to the offset between the reference axis and the curvilinear servo sector.

13. The apparatus of claim 12, wherein the sector addressing circuit comprises:

a sector counter, coupled to the sector data generator, for receiving a sector delay setting that represents a first portion of the offset between the reference axis and the curvilinear servo sector and incorporating the sector delay setting in the determination of the servo sector number.

14. The apparatus of claim 13, wherein the sector counter receives a sector clock signal that is used to increment the servo sector number, and wherein the sector addressing circuit further comprises:

a clock delay circuit, coupled to the sector counter, for outputting the sector clock signal, receiving a clock cycle delay setting that represents a second portion of the offset between the reference axis and the curvilinear servo sector, and incorporating the clock cycle delay signal into the sector clock signal.

15. The apparatus of claim 14, further comprising:

a fractional delay circuit, coupled to the sector data generator, for receiving a fractional delay setting that represents a third portion of the offset between the reference axis and the curvilinear servo sector and incorporating the third portion of the offset into the servo sector data output by the sector data generator.

16. The apparatus of claim 15, further comprising:

a delay interpolation generator, coupled to the fractional delay circuit, for producing fractional delay setting values derived from a base fractional delay and a delay increment corresponding to the location on the master disk.

17. A method for writing curvilinear servo sector patterns on a master disk, the method comprising:

generating a servo sector number that incorporates an offset between a reference axis and a curvilinear servo sector; and receiving the servo sector number and outputting servo sector data delayed according to the offset between the reference axis and the curvilinear servo sector.

18. The method of claim 17, wherein generating a servo sector number further comprises:

receiving a sector delay setting that represents a first portion of the offset between the reference axis and the curvilinear servo sector and incorporating the sector delay setting in the generation of the servo sector number.

19. The method of claim 18, wherein generating a servo sector number further comprises:

receiving a clock cycle delay setting that represents a second portion of the offset between the reference axis and the curvilinear servo sector, and incorporating the clock cycle delay signal into a sector clock signal that is used to generate the servo sector number.

20. The method of claim 19, further comprising:

receiving a fractional delay setting that represents a third portion of the offset between the reference axis and the curvilinear servo sector and incorporating the third portion into the servo sector data.

\* \* \* \* \*